United States Patent
Mutnuru

(10) Patent No.: US 11,336,615 B2
(45) Date of Patent: *May 17, 2022

(54) GLOBAL LOAD BALANCING ACHIEVED BY USING DISTRIBUTED DNS REFLECTION

(71) Applicant: Oracle International Corporation, Redwood Shores, CA (US)

(72) Inventor: Rishi Mutnuru, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/156,435

(22) Filed: Jan. 22, 2021

(65) Prior Publication Data

US 2021/0176205 A1 Jun. 10, 2021

Related U.S. Application Data

(63) Continuation of application No. 16/709,826, filed on Dec. 10, 2019, now Pat. No. 10,951,576.

(51) Int. Cl.
*H04L 61/4511* (2022.01)
*H04L 43/04* (2022.01)
*H04L 43/0864* (2022.01)

(52) U.S. Cl.
CPC ......... *H04L 61/1511* (2013.01); *H04L 43/04* (2013.01); *H04L 43/0864* (2013.01)

(58) Field of Classification Search
CPC ... H04L 61/1511; H04L 43/04; H04L 43/0864
See application file for complete search history.

(56) References Cited

U.S. PATENT DOCUMENTS 6,769,031 B1    7/2004  Bero
7,461,147 B1 * 12/2008  Mowat ............... H04L 67/1023
                                              709/239

(Continued)

FOREIGN PATENT DOCUMENTS

WO    WO-2013189021 A1 * 12/2013  ......... H04L 43/0864

OTHER PUBLICATIONS

Huang; Cheng et al.; A DNS Reflection Method for Global Traffic Management http://research.microsoft.com/en-us/um/people/chengh/papers/dns-reflection10.pdf; 6 pages.

*Primary Examiner* — Blake J Rubin
(74) *Attorney, Agent, or Firm* — Trellis IP Law Group, PC

(57) ABSTRACT

Round-trip times (RTT) values are estimated between meshed data centers serving an internet domain and a local domain name server (LDNS) associated with the data centers. A method initializes a shared database with proactively estimated RTTs and uses distributed DNS reflection to improve the accuracy of an estimated RTT value and update the shared database. RTTs may be proactively estimated by using pings, queries, or local DNS reflection. In local DNS reflection, a reflector sends a request to a collector in the same data center via the LDNS, and the collector measures the RTT. In distributed DNS reflection, a reflector in a first data center sends a request to a collector in a second data center via the LDNS. The collector calculates the latency, retrieves the (first) RTT between the first data center and the LDNS, and calculates the (second) RTT between the second data center and the LDNS by doubling the difference between the latency and half the first estimated RTT.

20 Claims, 6 Drawing Sheets

(56) References Cited

U.S. PATENT DOCUMENTS

| | | | |
|---|---|---|---|
| 8,326,980 B2* | 12/2012 | Huang | H04L 29/12066 709/239 |
| 8,732,268 B2 | 5/2014 | Huang | |
| 8,755,279 B2 | 6/2014 | Joshi | |
| 8,819,227 B1 | 8/2014 | Keralapura | |
| 8,943,180 B1 | 1/2015 | Petit-Huguenin | |
| 9,026,661 B2 | 5/2015 | Swildens | |
| 10,511,498 B1* | 12/2019 | Narayan | H04L 43/026 |
| 2006/0182034 A1* | 8/2006 | Klinker | H04L 45/3065 370/248 |
| 2008/0140847 A1* | 6/2008 | Almog | H04L 61/1511 709/228 |
| 2008/0155093 A1* | 6/2008 | Dharmistan | H04L 67/101 709/224 |
| 2009/0080336 A1* | 3/2009 | Zhang | H04L 43/00 370/248 |
| 2011/0153938 A1* | 6/2011 | Verzunov | G06F 9/5083 707/769 |
| 2011/0270964 A1* | 11/2011 | Huang | H04L 43/0864 709/224 |
| 2012/0066360 A1* | 3/2012 | Ghosh | H04L 43/0864 709/223 |
| 2012/0179814 A1* | 7/2012 | Swildens | H04L 12/14 709/224 |
| 2013/0013730 A1* | 1/2013 | Li | H04L 65/80 709/217 |
| 2014/0032785 A1* | 1/2014 | Chaudhuri | H04L 67/1002 709/245 |
| 2014/0258536 A1* | 9/2014 | Chiong | H04L 47/125 709/226 |
| 2014/0341109 A1* | 11/2014 | Cartmell | H04W 40/02 370/328 |
| 2015/0098333 A1* | 4/2015 | Lin | H04L 47/125 370/235 |
| 2016/0050178 A1* | 2/2016 | Frydman | H04L 61/1511 709/219 |
| 2016/0087931 A1* | 3/2016 | Kim | H04L 61/1511 709/203 |
| 2018/0167298 A1 | 6/2018 | He | |
| 2018/0270302 A1* | 9/2018 | Yang | H04L 67/1021 |
| 2018/0278571 A1 | 9/2018 | Gal | |
| 2020/0258118 A1 | 8/2020 | Kovvali | |
| 2020/0344084 A1* | 10/2020 | Shribman | H04L 67/025 |

* cited by examiner

GLOBAL LOAD BALANCING ACHIEVED BY USING DISTRIBUTED DNS REFLECTION

CROSS REFERENCES TO RELATED APPLICATIONS

This application is a continuation of the U.S. patent application Ser. No. 16/709,826, entitled METHOD AND APPARATUS FOR ACCURATE GLB ACHIEVED BY USING DISTRIBUTED DNS REFLECTION, filed on Oct. 12, 2019, which is hereby incorporated by reference, as if it is set forth in full in this specification.

This application is further related to U.S. patent application Ser. No. 16/709,820, entitled METHOD AND APPARATUS FOR MULTI-VENDOR GTM FABRIC, filed on Dec. 10, 2019, which is hereby incorporated by reference as if set forth in full in this application for all purposes.

BACKGROUND

The present application relates to computing, and more specifically to systems and methods for facilitating measuring computing network parameters, such as Round-Trip Times (RTTs) or latencies between Local Domain Name Servers (LDNSs) and Domain Name System (DNS) servers of data centers of a given domain, so as to facilitate Global Load Balancing (GLB), also called Global Traffic Management (GTM).

Systems and methods for facilitating measuring or estimating computing network metrics (also called parameters herein), such as latencies, are employed in various demanding applications, including Application Delivery Controllers (ADCs) of geographically distributed data centers. The ADCs service particular domains and may employ GLB algorithms to select data centers to service particular requests based on the measured or estimated metrics.

Generally, GLB involves using estimates of message RTTs between computing nodes of the network, so as to facilitate distributing network traffic along the fastest communications links. More specifically, ADCs of data centers used by a given domain (e.g., www.example.com) may implement GLB functionality that attempts to estimate RTTs between Local Domain Name Servers (LDNSs) and various geographically distributed data centers used to host a particular domain. The LDNSs may be hosted by Internet Service Providers (ISPs) that communicate with client devices and/or applications. The client devices and/or applications use the ISPs to access data and/or functionality provided by one or more of the data centers. The data centers are used to service client requests for data and/or functionality on behalf of the client devices and/or applications.

Conventionally, rough relative estimates of RTTs can be obtained based on geographic proximity information, where data centers that are physically located closer to a particular LDNS are assumed to have relatively shorter RTTs between the LDNS and the geographically nearest data center. However, in practice, variations in network traffic, changes in network topology, and variations in computing resource loads and associated availability (to process requests for data and/or functionality) can make such estimates inaccurate.

Alternatively, active methods are used to estimate the RTTs between LDNSs and distributed data centers hosting particular domains. Such active methods may involve, for instance, a data center (e.g., an ADC thereof) issuing pings (e.g., Internet Control Message Protocol (ICMP) echo requests and echo replies) or queries (e.g., Transmission Control Protocol (TCP) SYN and ACK handshakes), and then measuring the times required for the pings or queries to be returned by the LDNSs. This provides estimates (i.e., RTT estimates, also called latency estimates) of how a particular communications link is performing, and whether or not such link should be preferentially used relative to another possible link. However, in practice, such approaches tend to have limited reachability, as many data centers may not respond to such pings or queries, or otherwise may employ firewalls that drop packets of such pings or queries.

Accordingly, a need remains for methods that can efficiently and accurately estimate, and then use, latency information between LDNSs and data centers of a domain, so as to facilitate optimal selection of a data center to service a request from a client associated with a particular LDNS.

SUMMARY

Global Load Balancing (GLB) for meshed data centers that jointly serve an internet domain requires having up-to-date and accurate estimated values for round-trip times (RTTs) between the data centers and local domain name servers (LDNSs) associated with them. Each data center includes a reflector configured for sending and receiving requests, and a collector configured for receiving requests. In embodiments of the invention, the data centers share a shared database, which may be or include a distributed ledger. The shared database is used for sharing the estimated RTT values.

In a first aspect, an embodiment of the invention provides a method for estimating RTT values between two or more data centers and their associated LDNSs. The method includes the steps of: (1) initializing the shared database with proactively estimated RTT values; (2) using distributed DNS reflection to improve an estimated RTT value; and (3) storing the improved estimated RTT value in the shared database.

The method may proactively estimate an RTT value using a ping (an Internet Control Message Protocol (ICMP) echo request and reply) or a TCP handshake. Alternatively, an embodiment may proactively estimate an RTT value by sending a request from a data center's reflector to the data center's collector via the data center's associated LDNS, and calculating a difference between a receipt time in the collector and a send time in the reflector. An embodiment may passively estimate an RTT value by using proximity metrics (see U.S. patent application Ser. No. 16/709,820).

The embodiments improve an estimated RTT value by using distributed DNS reflection. Distributed DNS reflection may include the following steps. (2a) From a first reflector in a first data center with a first estimated RTT to its associated LDNS, sending a request to a second collector in a second data center configured to communicate with the same associated LDNS. The request includes a first timestamp that indicates a time of sending the request from the first reflector, and the first estimated RTT is stored in the shared database. (2b) In the second collector, determining a time of receiving the request. (2c) Calculating a latency by subtracting the time of sending the request from the time of receiving the request. (2d) Retrieving the first estimated RTT from the shared database. (2e) Calculating a second estimated RTT by doubling a difference between the latency and half the first estimated RTT. Step (2e) may use the formula $RTT2 = [(T_{Receive2} - T_{Send2}) - 0.5*(RTT1)]*2$.

In a second aspect, an embodiment provides a non-transitory processor-readable medium (or memory device) with executable instructions providing a method as described above.

In a third aspect, an embodiment provides a system that performs a method as described above. The system includes two or more meshed data centers that jointly serve an internet domain. Each data center includes a reflector and a collector, and each datacenter is associated with an LDNS. The two or more meshed data centers share a shared database, which may be or include a distributed ledger.

A further understanding of the nature and the advantages of particular embodiments disclosed herein may be realized by reference of the remaining portions of the specification and the attached drawings.

DETAILED DESCRIPTION

Figure 1:
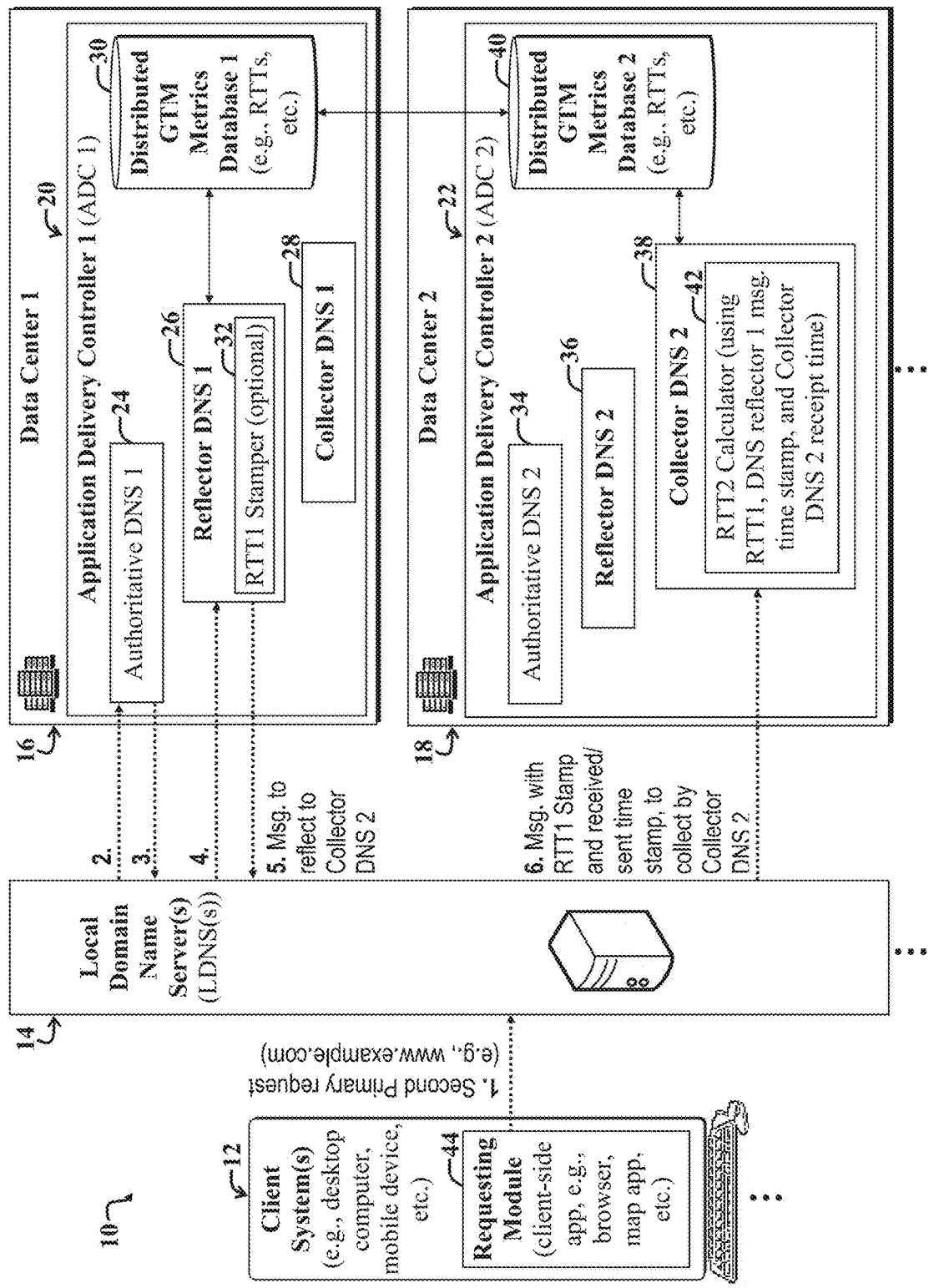
FIG. 1 illustrates a first example system and accompanying computing environment employing a Global Load Balancing (GLB) system using a combination of local DNS reflection and distributed DNS reflection to populate a database with Round Trip Times (RTTs) used by Application Delivery Controllers (ADCs) of geographically distributed data centers to facilitate GLB decision making.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on. Enterprise computing environments are often networked computing environments.

A networked computing environment may be any computing environment that includes intercommunicating computers, i.e., a computer network. Similarly, a networked software application may be any software application (e.g., a mobile app, desktop browser plugin, etc.) that communicates with one or more computing resources via a computer network.

A given software application may include (but not necessarily) constituent software applications or modules (e.g., services, functions, procedures, computing objects, plugins, extensions, etc.). Accordingly, the term "software application" may also include networked software applications or integrated groups thereof.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Enterprise software applications, including applications for implementing cloud services, are often distributed among one or more servers as part of a computing domain, also called a server domain or server system herein. For the purposes of the present discussion, a computing domain may be any collection of one or more servers running software that is managed by a single administrative server or associated application or entity.

A cloud service may be any mechanism (e.g., one or more web services, Application Programming Interfaces (APIs), etc.) for enabling a user or other software program to employ data and/or functionality provided via a cloud. A cloud may be any collection of one or more servers. For example, certain clouds are implemented via one or more data centers with servers that may provide data, data storage, and other functionality accessible to client devices.

Generally, Global Traffic Management (GTM), also called Global Load Balancing (GLB) may be any method for selecting Domain Name System (DNS) Servers (also simply called DNSs) to serve client DNS requests. Note that network clients, such as browser, mobile device apps, and so on, often rely upon DNS to identify server IP addresses for accessing and/or interacting with content and functionality hosted by particular domains (e.g., www.example.com).

A network of data centers may be geographically distributed across large distances and be used to serve (i.e., host) a particular domain. GTM algorithms running on Application Delivery Controllers (ADCs) at each data center may monitor latency estimates between Local Domain Name Servers (LDNSs) and the various data centers, so as to select the data center offering the lowest latency for a particular LDNS and its clients communicating therewith.

For the purposes of the present discussion, an application delivery controller may be any functionality for facilitating implementing control over one or more servers or systems of a datacenter, e.g., as part of an Application Delivery Network (ADN), including, for instance, selectively controlling loads on different servers, performing GTM tasks, traffic shaping application-layer security, content switching, and so on.

For clarity, certain well-known components, such as hard drives, processors, operating systems, power supplies, routers, Internet Service Providers (ISPs), certain web services, virtual machines, middleware, MetaData Services (MDS) modules, Policy Decision Points (PDPs), Policy Information Points (PIPs), Policy Administration Points (PAPs), Policy Enforcement Points (PEPs), identity service providers, the Internet, root DNSs, and so on, are not necessarily explicitly called out in the figures. However, those skilled in the art with access to the present teachings will know which components to implement and how to implement them to meet the needs of a given implementation.

FIG. 1 illustrates a first example system 10 and a computing environment employing a Global Load Balancing (GLB) system using a combination of local DNS reflection and distributed DNS reflection to populate a shared or distributed database 30, 40 with Round Trip Times (RTTs) used by Application Delivery Controllers (ADCs) 20, 22 of geographically distributed data centers 16, 18 to facilitate GLB decision making.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example in certain embodiments, the distributed GTM metrics database 30, 40 may instead be implemented via a cloud-based service that provides access to a more centralized GTM metrics database, as discussed more fully in the above identified and incorporated U.S. Patent Application, entitled METHOD AND APPARATUS FOR MULTI-VENDOR GTM FABRIC.

Furthermore, while the ADCs 20, 22, are shown including various additional modules (e.g., modules 24-42) note that, in practice, the ADCs may merely front-end or control certain behaviors or processing tasks of the modules, such that the modules need not be shown as included within the ADCs 20, 22, but rather in communication therewith. In addition, each of the ADCs 20, 22, may include additional GTM or GLB modules (e.g., for implementing GTM algorithms). The GTM modules are not shown separately in FIG. 1, as generally the functionality for implementing the GTM methods discussed herein may be distributed among the associated DNS servers, including time stampers (e.g., a first RTT time stamper 32) and RTT calculators (e.g., a second RTT calculator 42) and/or may represent part of the control functionality implementing the ADC modules 20, 22. Such control functionality, for implementing DNS reflection methods discussed herein, can be implemented with minor modifications to various existing ADC technologies and/or accompanying servers governed by the ADCs 20, 22.

For the purposes of the present discussion, software functionality may be any function, capability, or feature, e.g., stored or arranged data, that is provided via computer code, i.e., software. Software functionality may include actions, such as retrieving, performing a load-balancing task, an enterprise-related task, and so on.

In the present example embodiment, one or more client systems 12 communicate with one or more Local DNS servers (LDNSs) 14. The client system(s) 12 communicating with the LDNS(s) 14 are approximately similarly located geographically, such that the client system(s) 12 are said to be local to their respective LDNSs 14, and the LDNSs 14 are said to be local to the client system(s) 12 communicating therewith. Note that the term "DNS," depending upon the context in which the term is used, may refer to "Domain Name System" or "Domain Name Server." In some instances, a domain name server may be simply called a "DNS" as opposed to a "DNS server."

The one or more LDNSs 14 communicate with plural data centers (e.g., a first data center 16 and a second data center 18) hosting a particular domain identified by a domain name (e.g., www.example.com). The first data center 16 includes a first ADC 20 that acts as a front end for various modules 24-32 of the first data center 16, and facilitates implementing GLB embodiments discussed herein.

The first ADC 20 includes or communicates with a first authoritative DNS server 24, a first reflector DNS server (also simply called a reflector or DNS reflector 26), a first collector DNS server (also simply called a collector or DNS collector) 28. The first ADC 20 and accompanying modules 24-28 may access, update, revise, etc. data from a distributed GTM metrics database 30, 40 in accordance with permissions allocated to the modules by the distributed database 30, 40. A first portion 30 of the GTM metrics database 30, 40 is replicated at the first data center 16. Similarly, a second portion 40 is replicated at the second data center 18.

The second ADC 22 of the second data center 18 may be constructed similarly to the first ADC 20. Accordingly, the second ADC 22 includes or communicates with a second authoritative DNS server 34, a second reflector DNS server 36, and a second collector DNS server 38. The replicated second portion 40 of the distributed database 30, 40 is shown in communication with the second ADC 22.

Note that exact details of technologies used to implement the distributed database 30, 40 are implementation specific and may vary to meet the needs of a given implementation. For example, distributed ledger technology may be employed. Generally, for the purposes of the present discussion, a database may be any collection of information. This can include data that is co-located on a single machine, or distributed data, e.g., as may be implemented via a distributed ledger.

Note that in the present example embodiment, the data centers 16, 18 represent peers of a meshed network of data centers, and generally may intercommunicate and share information. The data centers 16, 18 may form part of a peer-to-peer network of geographically distributed data centers.

In an example use case scenario, the first data center 16 initially uses the co-located first reflector DNS server 26 and first collector DNS server 28 to determine, using local DNS reflection, a first RTT value, which represents an estimate or measurement of round-trip message travel time or latency between the LDNS 14 and the first data center 16. Local DNS reflection methods that may be used with embodiments discussed here are discussed more fully in the above-identified and incorporated U.S. Patent Application, entitled METHOD AND APPARATUS FOR MULTI-VENDOR GTM FABRIC.

After measuring the first RTT value (RTT1), the distributed GTM metrics database 30, 40 is selectively updated with the first RTT value, where the updated first portion 30 is replicated to the second portion 40 at the second data center 18.

For the purposes of the present discussion, a reflector DNS server may be any DNS server that includes or implements (or otherwise accesses and uses) functionality for selectively returning messages to an LDNS for resending elsewhere, e.g., to a collector DNS server. A collector DNS server may be any server with functionality for receiving and processing request messages that have been reflected from one or more reflector DNS servers.

A message is said to be reflected, e.g., by a reflector DNS server (e.g., the first reflector DNS server 26), if the request is returned (e.g., at step 5) to an LDNS (e.g., the LDNS 14, as step 5) for resending to the same or different DNS server (e.g., to the first collector DNS server 28 when implementing local DNS reflection, or to the second collector DNS server 38, when implementing distributed DNS reflection).

Note that the message that is resent (e.g., corresponding to a message at step 5) by the same DNS server (e.g., the first reflector DNS server 26) may include additional information (beyond that which was included in the initial message sent, e.g., sent at step 4, to a reflector DNS server by an LDNS server) in the reflected message (e.g., corresponding to the message at step 5, which is reflected back to the LDNS for further reflection to an indicated collector DNS server).

For instance, a reflector DNS server (e.g., the first reflector DNS server 26) may incorporate into a message reflected (e.g., at step 5) to the LDNS 14, the IP address of an intended recipient (e.g., an IP address of the first DNS collector server 28 or the second collector DNS server 38) of the reflected message, a time stamp at which the original request message was received (from the LDNS 14) by the reflector DNS server 26, and so on, as necessary to meet the needs of particular implementations of embodiment discussed herein.

Similarly, a message is said to be collected by a collector DNS server if a message sent by a reflector DNS server to an LDNS is then forwarded by the LDNS to the collector DNS server. A collector DNS server may be any DNS server that receives a reflected message, or modified version thereof (e.g., as may be selectively modified by an LDNS), from a reflector DNS server.

The first ADC 20 may facilitate implementing local DNS reflection to measure the first RTT by reflecting a time-stamped DNS request (e.g., as received at step 4 in FIG. 1) back to the first DNS collector server 28, which compares the time stamp to the receipt time, so as to measure and obtain the first RTT value.

When implementing distributed DNS reflection, the first reflector DNS 26 reflects the associated DNS request (at step 5) to the second collector DNS server 38 at the second data center 18, as opposed to reflecting it back to the first collector 28 that is co-located with the first reflector DNS server 26 at the first data center 16.

The first reflector DNS 26 at the first data center 16 is said to be the master of the slave collector DNS server 38 at the second data center 18. Note that the second reflector DNS server 36 may also reflect DNS requests to other DNS collectors at other datacenters of the accompanying computing environment, and which service the same primary domain (e.g., www.example.com). The second reflector DNS server 36 is said to be the master of other DNS collectors at other data centers.

During distributed DNS reflection (to estimate or provide a second RTT value estimating the latency between the second data center 18 and the LDNS 14), the second collector 38 receives the reflected message (at step 6) returned from the LDNS 14 in response to the receipt of the request received by the LDNS 14 (at step 5) by the first reflector DNS 26 to reflect the accompanying message to the second collector DNS server 38 at the second data center.

The request reflected to the second collector DNS server 38 (at step 6) may optionally include both a time stamp indicating when the first reflector DNS server 26 initially received the request (at step 4) and/or sent the message to be reflected (at step 5), and a time stamp corresponding to the first RTT estimate (e.g., RTT1). Accordingly, the first reflector DNS server 26 includes or communicates with an RTT time stamper 32.

This first RTT value, in combination with a receipt time measured at the second collector DNS server 38 based on when it received the reflected message (at step 6) are used to compute or estimate the second RTT value (for the round-trip latency between the LDNS 14 and the second data center 18.

Note however, that the first RTT value need not be time stamped into the reflected message, as the second ADC 22 may access the first RTT value via the distributed GTM metrics database 30, 40 in which it is stored.

For illustrative purposes, the second collector DNS server 38 includes or communicates an RTT calculator 42 for estimating the second RTT value (RTT2) based on the first RTT value and the measured latency for a message traveling from the first reflector DNS server 26, to the LDNS 14, and back to the second collector DNS server 38.

An example equation implemented by the RTT calculator 42 includes $$RTT2 = [(TR2 - TS2) - 0.5 * (RTT1)] * 2,$$

where RTT2 represents the second RTT value; TR2 represents the time at which the reflected request was received by the second collector 38 (at step 6) in terms of Coordinated Universal Time (UTC); TS2 represents a time identified by the time stamp (in terms of UTC) applied to the request by the first reflector DNS server 26 in terms of UTC, and RTT1 represents the first RTT value.

Accordingly, the second RTT may be estimated as twice the difference between a first request message travel time (i.e., the request message travel time or latency between the first reflector DNS server 26, the first LDNS 14, and the second collector DNS server 38) and half of the message travel time (RTT1) between the first reflector DNS server 26 and the first collector DNS server 28. RTT values obtained using distributed DNS reflection as discussed herein may be stored separately in the distributed GTM metrics database 30, 40, thereby augmenting any preexisting RTT data obtained using other methods, e.g., local DNS reflection. The ADCs 20, 22 may selectively use values obtained using different RTT estimation methods, including distributed DNS reflection, as needed to meet the needs of a given GLB implementation.

Figure 2:
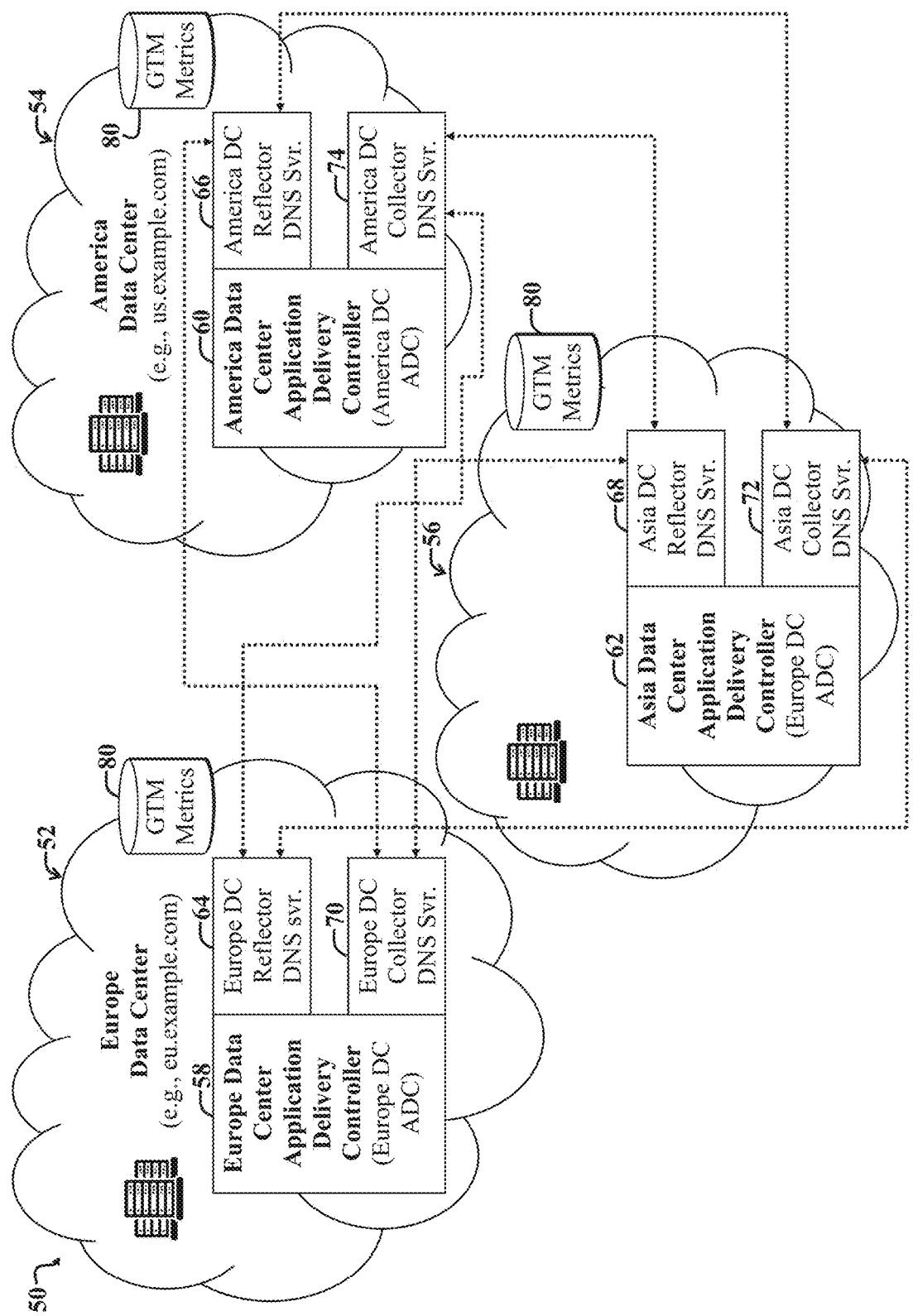
FIG. 2 illustrates a second example system and accompanying computing environment highlighting intercommunications between meshed data centers and accompanying reflectors and collectors located at different geographically distributed data centers.

FIG. 2 illustrates a second example system 50 and accompanying computing environment highlighting intercommunications between meshed data centers 52-56 and accompanying reflectors 64-68 and collectors 70-74 located at the different geographically distributed data centers 52-56.

The first example data center 52 represents a data center located in Europe, i.e., represents the Europe data center used to service a particular domain (e.g., www.example.com). The Europe data center 52 is front-ended or otherwise subject to GTM and associated GLB algorithms of a Europe ADC 58. The Europe ADC communicates with Europe Data Center (DC) reflector DNS server (also simply called reflector herein) 64 and a Europe DC collector DNS server (also simply called collector herein) 70 and selectively uses the DNS servers 64, 70 to measure or estimate RTTs between itself and LDNSs communicating therewith when using local DNS reflection and to selectively communicate with other collectors (slave collectors 72, 74 to the master reflectors) on other data centers, when implementing distributed DNS reflection, as discussed more fully below.

Similarly, an America data center 54, e.g., which may be located in the United States (for instance), includes an America ADC 60 that fronts an associated an America DC reflector DNS server 66 and collector DNS server 74, which are used to actively measure or estimate RTTs between the America data center 54 and LDNSs communicating therewith when implementing local DNS reflection. The local America reflector 66 communicates with other collectors 70, 72 of other data centers 52, 56, respectively, when facilitating implementing distributed DNS reflection, as discussed more fully below.

Similarly, an Asia data center 56, which may be located in India (for instance), includes an Asia ADC 62 that fronts an associated Asia DC reflector DNS server 68 and DNS collector DNS server 72, which are used to actively measure or estimate RTTs between the Asia data center 56 and LDNSs communicating therewith when implementing local DNS reflection. The local Asia reflector 68 communicates with other collectors 70, 74 of other data centers 52, 56, respectively, when facilitating implementing distributed DNS reflection, as discussed more fully below.

Each data center 52-56 may maintain shared access to a distributed and replicated GTM metrics database 80 for maintaining RTT values and other GTM metrics (e.g., proximity data, etc.) as may be needed for a particular implementation of embodiments discussed herein.

Note that each reflector 64-68 in FIG. 2 communicates with the two other collectors at the other data centers, so as to measure or estimate RTT values using distributed DNS reflection. When a given reflector at a first data center reflects a message to a slave collector at another second data center, and a reflector of that data center then acts as a master for a collector and a third data center, the relationships are said to implement a master-slave hierarchy.

Figure 3:
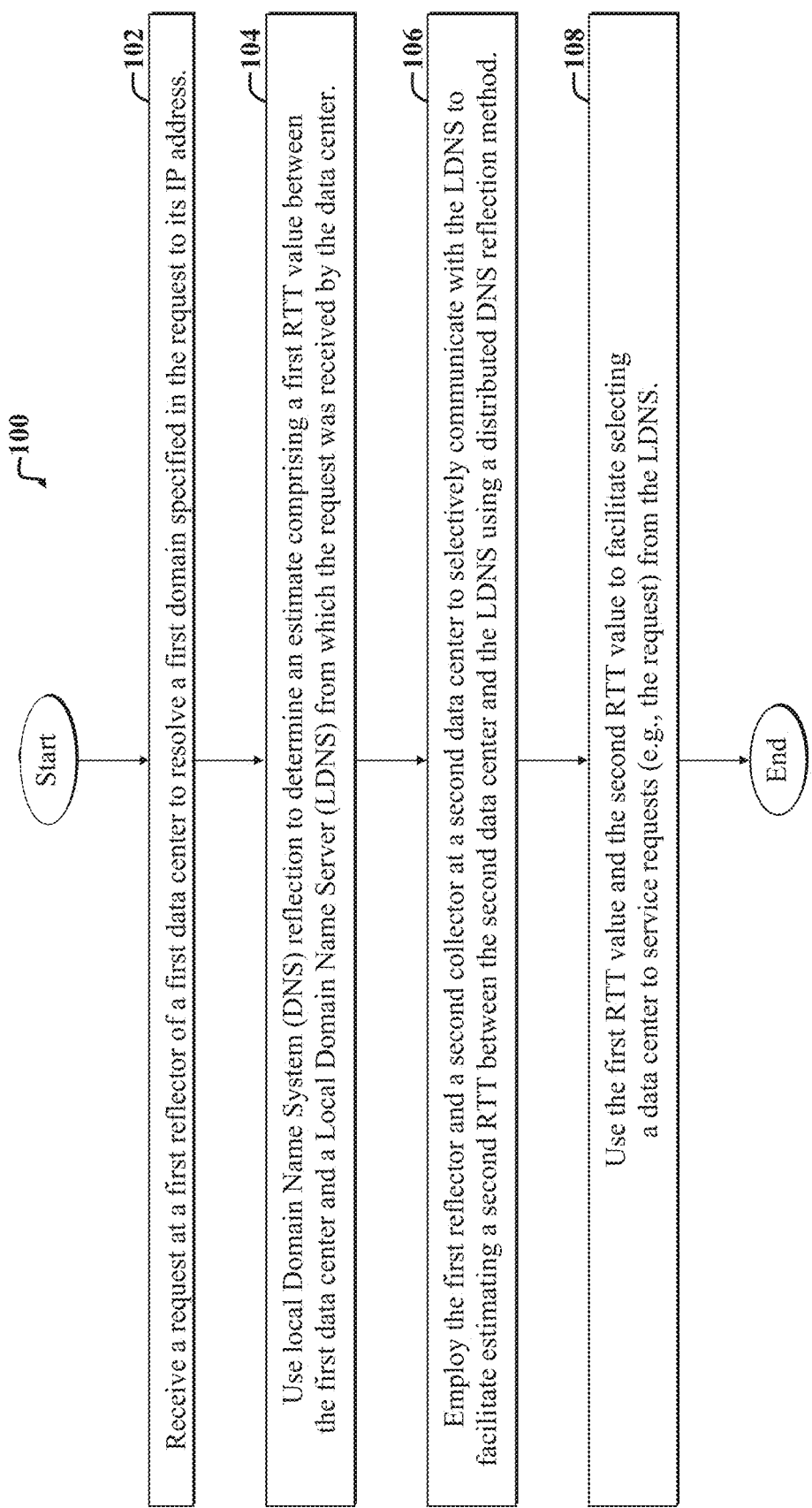
FIG. 3 is a flow diagram of a first example method usable by the embodiments of FIGS. 1-2.

FIG. 3 is a flow diagram of a first example method 100 usable by the embodiments of FIGS. 1-2 to facilitate implement latency or RTT measurements and implement accompanying GTM, also called GLB.

An initial message-receiving step 102 includes receiving a request at a first reflector (e.g., the reflector 26 of FIG. 1) of a first data center (e.g., the first data center 16 of FIG. 1) to resolve a first domain (e.g., www.example.com) specified in the request to its IP address.

Next, a local DNS reflection step 104 includes using a local DNS reflection to determine an estimate or value representing a first RTT value or latency between the first data center (and/or accompanying ADC) and an LDNS from which the request was received by the first data center (i.e., ADC thereof).

Next a distributed DNS reflection step 106 includes employing the first reflector and a second collector (e.g., the collector 38 of FIG. 1) at a second data center (e.g., the data center 18 of FIG. 1) to selectively communicate with the LDNS to facilitate determining a second RTT value or latency between the second data center.

A GTM step 108 includes using the first RTT value and the second RTT value to facilitate selecting a data center to service requests (e.g., the request) from the LDNS.

Note that the first example method 100 may be altered, without departing from the scope of the present teachings. Additional steps may be added; steps may be removed, interchanged, and soon, without departing from the scope of the present teachings.

For example, the distributed DNS reflection step 106 may further specify using the first reflector to reflect the request to the second collector at the second data center via the LDNS via an adjusted request, wherein the adjusted request represents an adjusted version of the request, and wherein adjustments to the request that are included in the adjusted second request include a time stamp indicating when the second request was received by the first reflector; receiving, at the second collector, the adjusted request; using the adjusted request; a time at which the adjusted request was received by the second collector; the time stamp, and the estimate of an RTT value between the first data center and the LDNS to estimate a second RTT value between the second data center and the LDNS; and storing the second RTT value in a database that is accessible by and updatable by the first data center and the second data center.

The local DNS reflection step 104 may further include reflecting the first request to the first collector at the first data center via an adjusted first request sent to the LDNS, wherein the adjusted first request represents an adjusted version of the first request, wherein adjustments to the first request that are included in the adjusted first request include a first time stamp indicating when the first request was received by the first reflector, and wherein the adjustments further include IP address of the first collector located at the first data center; computing a first RTT value between the first data center and the LDNS based on the difference between a time at which the first collector receives the adjusted first request and a time indicated by the first time stamp included in the adjusted first request; and storing the first RTT value in a database that is accessible to and updatable by the first data center and a second data center.

The first example method 100 may further specify the database includes a database that is shared by a first ADC of the first data center and a second ADC of the second data center via a web service or Application Programming Interface (APT) that is accessible to the first ADC and the second ADC. Alternatively, the database may include or represent distributed database that is distributed among and replicated between the first data center and the second data center.

The first request and the second request may include CNAME of a primary domain name. The primary domain name may have been initially sent to the LDNS by one or more client devices in communication therewith.

The first reflector at the first data center may represent a master DNS, and the second collector at the second data center may represent a slave DNS to the first reflector.

The first example method 100 may further specify that second ADC at the second data center includes or communicates with a second reflector, which acts as a master to a third collector at a third data center used to service requests involving the primary domain name, so as to estimate a third RTT between the third data center and the LDNS, whereby a hierarchy is established between the first reflector, the second collector, the second reflector, and the third collector.

The hierarchy may be used to facilitate populating the database with estimates of RTTs between data centers servicing a primary domain and plural LDNSs in communication with the data centers, wherein the plural LDNSs include the LDNS. The first request and the second request may include a CNAME corresponding to a primary domain name representing a domain that is serviced by plural geographically distributed data centers, including the first data center and the second data center.

The first example method may further specify estimating or measuring the second RTT in accordance with the following equation:

$$RTT2=[(TR2-TS2)-0.5*(RTT1)]*2,$$

wherein RTT2 represents the second RTT value; TR2 represents the time at which the second request was received by the second collector in terms of Coordinated Universal Time (UTC); TS2 represents a time identified by the second time stamp in terms of UTC, and RTT1 represents the first RTT.

Accordingly, the first example method 100 represents a distributed DNS reflection method, where the DNS reflector and collector involved in the request reflection and collection need not be at the same physical location or data center.

Note that with local DNS reflection, the reflector and collector is co-located at the same data center and/or running on the same computer.

Figure 4:
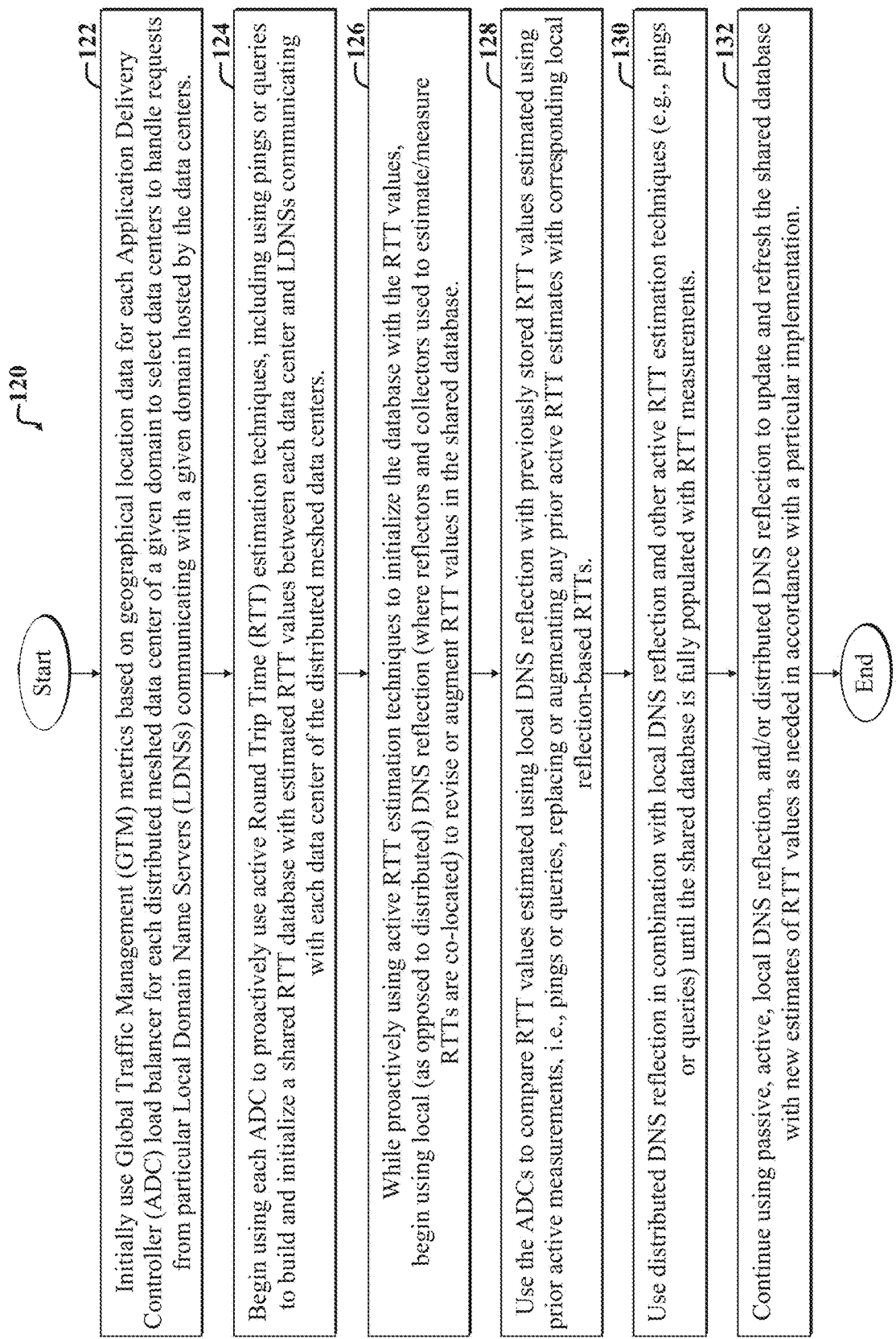
FIG. 4 is a flow diagram of a second example method usable by the embodiments of FIGS. 1-3.

FIG. 4 is a flow diagram of a second example method 120 usable by the embodiments of FIGS. 1-3 to facilitate GTM using multiple types of GTM metrics obtained using different RTT estimation techniques, including distributed DNS reflection.

A first step 122 includes initially using GTM metrics based on geographical location data for each ADC load balancer (GLB) for each distributed meshed data center (e.g., corresponding to the meshed data centers 16, 18 of FIG. 1 and the meshed data centers 52-56 of FIG. 2) of a given domain to select data centers to handle requests from particular Local LDNSs (e.g., the LDNS 14 of FIG. 1) in communication with the distributed meshed data centers servicing a particular domain (e.g., servicing www.example.com).

A second step 124 includes using each ADC of each data center to proactively use active RTT estimation techniques, including RTT estimation methods involving use of pings or queries, to build and initialize a shared RTT database (e.g., corresponding to the distributed GTM metrics database 80 of FIG. 2) with estimated RTT values between each data center and LDNSs communicating with each data center of the distributed meshed data centers.

A third step 126 includes beginning using local (as opposed to distributed) DNS reflection (where reflectors and collectors used to measure or estimate RTTs are co-located) to revise or augment RTT values in the shared database. This can occur simultaneously with proactively using active RTT estimation techniques to initialize the database with the RTT values, as specified for the second step 154.

A fourth step 128 includes using the ADCs, i.e., functionality implemented thereby, to compare RTT values estimated using local DNS reflection with previously stored RTT values estimated using prior active measurements, i.e., pings or queries, and replacing or augmenting any prior active RTT estimates with estimates based on the local DNS reflection.

A fifth step 130 includes using distributed DNS reflection in combination with local DNS reflection and other active RTT estimation techniques (e.g., pings or queries) until the shared database is fully populated with RTT measurements.

A sixth step 132 includes continuing using passive, active, local DNS reflection, and/or distributed DNS reflection to update and refresh the shared database with new estimates of RTT values as needed in accordance with a particular implementation.

Note that the second example method 120 may be modified, without departing from the scope of the present teachings. For example, certain steps may be added, removed, interchanged with other steps, and so on, without departing from the scope of the present teachings.

For example, the second example method 120 may further specify use of a load balancer (implemented by an ADC) to front (also called front-end) each data center, where each load balancer load balancer is configured with DNS reflector and collector capabilities.

Each reflector in the network topology, i.e., the structure of the overall computing environment, may act as a master for each collector in the topology. Each collector in the topology acts as a slave for all master reflectors. The topology may incorporate multiple master DNS reflectors and multiple DNS slave collector hierarchies.

Each collector in the topology is configured with a unique CNAME for the given domain hosted by each data center, where traffic to and/or from the domain is monitored and/or controlled by the load balancer (e.g., GLB) implemented by each ADC of each data center.

The ADCs participating in GLB may form a GLB mesh, whereby they exchange message time stamps. The ADCs may also exchange time zone information so as to compensate for time differences at the different data center locations (corresponding to the ADC locations), if the time stamps are not already in the UTC format.

Initially a geo IP-location database is loaded by all ADCs and accompanying load balancing devices. When a DNS query (also called a DNS request, or DNS request message herein) arrives at an ADC, the accompanying GLB decision may occur using the static proximity methods and data.

Each load balancer may proactively measure the RTT using the geo-IP database supplied IP address entries, thereby facilitating proactively measuring the RTTs for the client IP address (and/or associated LDNSs that the client devices communicate with to resolve domain names to access data and functionality of particular domains hosted by the data centers).

The ADCs may participate in a mesh topology to exchange and share this measured RTT information with each other peer ADC. Note that the RTT database (e.g., the distributed GTM metrics database of FIG. 2) may not necessarily be completed entirely using DNS reflection. For instance the ADCs may start using active measurement techniques, such as pings or queries, to proactively to build and initialize the shared RTT database used for global load balancing. This active step can continue as DNS reflection methods complete.

The second example method 120 may further specify that when a DNS query arrives to an ADC load balancer, the ADC may measure the DNS RTT using local DNS reflection for the given client with DNS reflector and collector being in the same physical location (e.g., same device and/or data center).

After computing the RTT using local DNS reflection, the computed RTT (i.e., RTT value) may then be exchanged with peer ADCs and associated data centers, e.g., via the distributed database 80 of FIG. 2.

Since local DNS reflection based RTT methods only measure or estimate latency between a single data center and an LDNS (also called local DNS resolver herein) for a given DNS request, the ADC the load balancer may then compare the RTT computed by local DNS reflection with the RTT supplied by peer load balancers using active measurement. Each load balancer may flag how it computed RTT value, and then exchange the RTT value with its peers.

When the DNS request arrives to any of the ADC load balancers for second time from given LDNS, the ADC load balancer may then direct the DNS request using the CNAME record for a collector at a data center that has not yet computed or measured its RTT via DNS reflection. This process may iteratively continue for a given LDNS (DNS resolver) until all participating data centers (and associated ADC load balancers) participating in GLB are measured for that LDNS.

Note that the ADCs front ending the data centers may update other data centers with following attributes for the new DNS requests: LDNS IP, current timestamp, and RTT from given LDNS client.

Note that when a collector from different geographic location than the reflector receives the DNS request for the CNAME, it may wait for a configurable time (e.g., 1 millisecond) holding the DNS request, so as to allow time to obtain to the update from the reflector who originally replied with the CNAME.

The data centers participating in this distributed DNS reflection exchange the RTT values for all possible clients (LDNSs), thereby ensuring the best data center selection to process requests from those clients.

In the event that RTT measurements have not completed for all data centers communicating with the LDNS, a data center selection using the GLB methods discussed herein may occur when a configurable threshold number of data centers (associated ADCs) have measured the RTT values using active and/or passive measurement techniques.

Note that an ADC load balancer may also account for factors (e.g., computing resource loads, available data center storage space, etc.), other than only RTT values, when selecting data centers to handle requests from a given LDNS.

Although the description has been described with respect to particular embodiments thereof, these particular embodiments are merely illustrative, and not restrictive. For example, while various embodiments are discussed herein as using a combination of passive and active RTT estimation techniques, including local DNS reflection and distributed DNS reflection, embodiments are not limited thereto. For example, certain embodiments may employ distributed DNS reflection without use of local DNS reflection, without departing from the scope of the present teachings.

Figure 5:
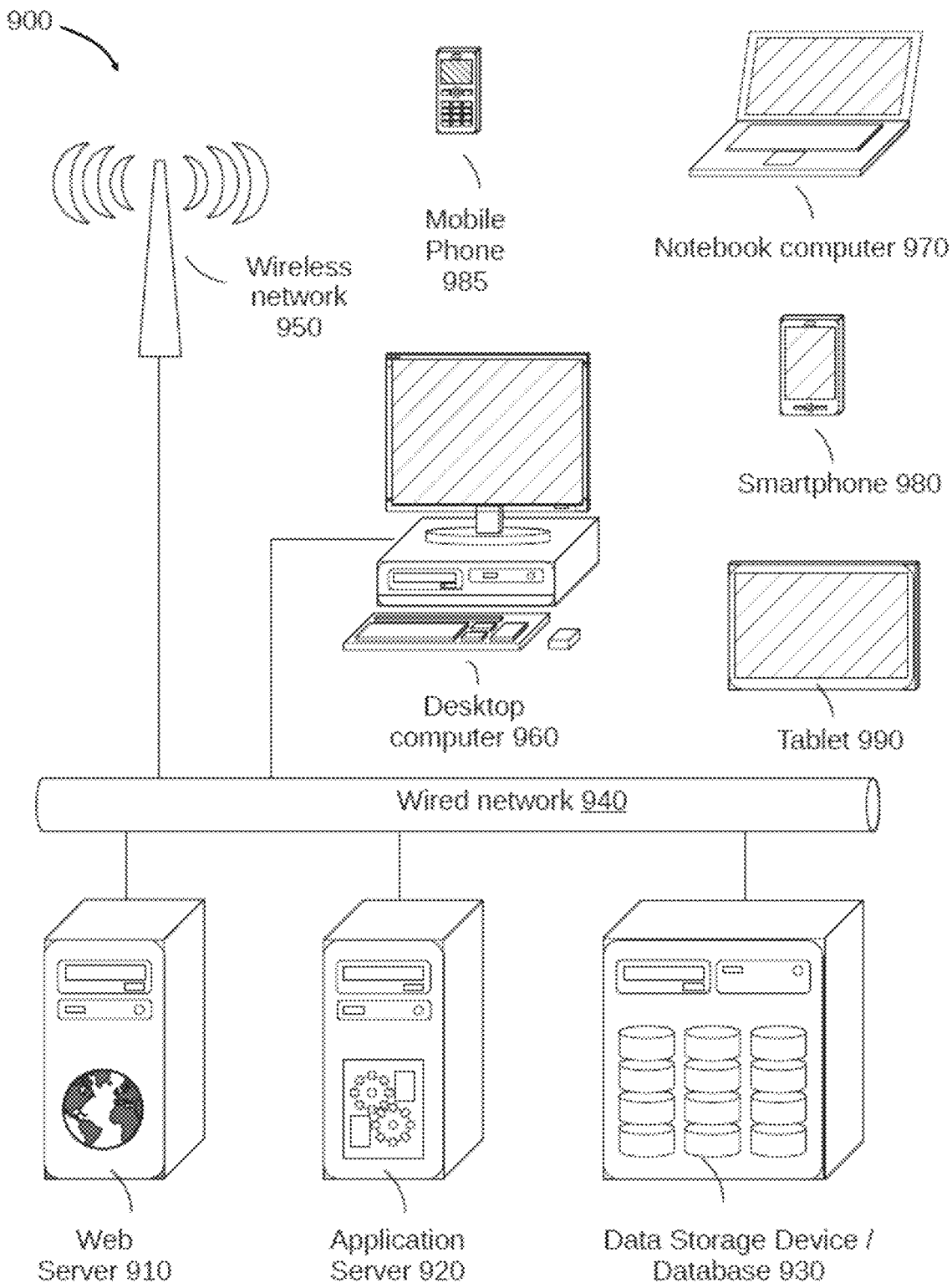
FIG. 5 is a general block diagram of a system and accompanying computing environment usable to implement the embodiments of FIGS. 1-4.

FIG. 5 is a general block diagram of a system 900 and accompanying computing environment usable to implement the embodiments of FIGS. 1-4. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 5, the client system(s) 12 of FIG. 1 may be implemented via one or more of the desktop computer 960, tablet 990, smartphone 980, notebook computer 970, and/or mobile phone 985 of FIG. 5. The data centers 16, 18 and accompanying servers 24-38 of FIG. 1 may be implemented via the web server 910 and/or application server 920 of FIG. 5.

In one example scenario, the GTM algorithms of the ADCs 20, 22 run on an application server (e.g., the application server 920 of FIG. 5), but are accessible (to authenticated users and client-side software) via webpage code of a website hosted by the web server 910 of FIG. 5. In certain embodiments, the GTM metrics database 30, 40 may be maintained via the data storage device 930 of FIG. 5, which may store so-called cloud-based data, including GTM metrics, such as RTTs, and may further include or represent backend databases accessible via software running on the application server 920.

Figure 6:
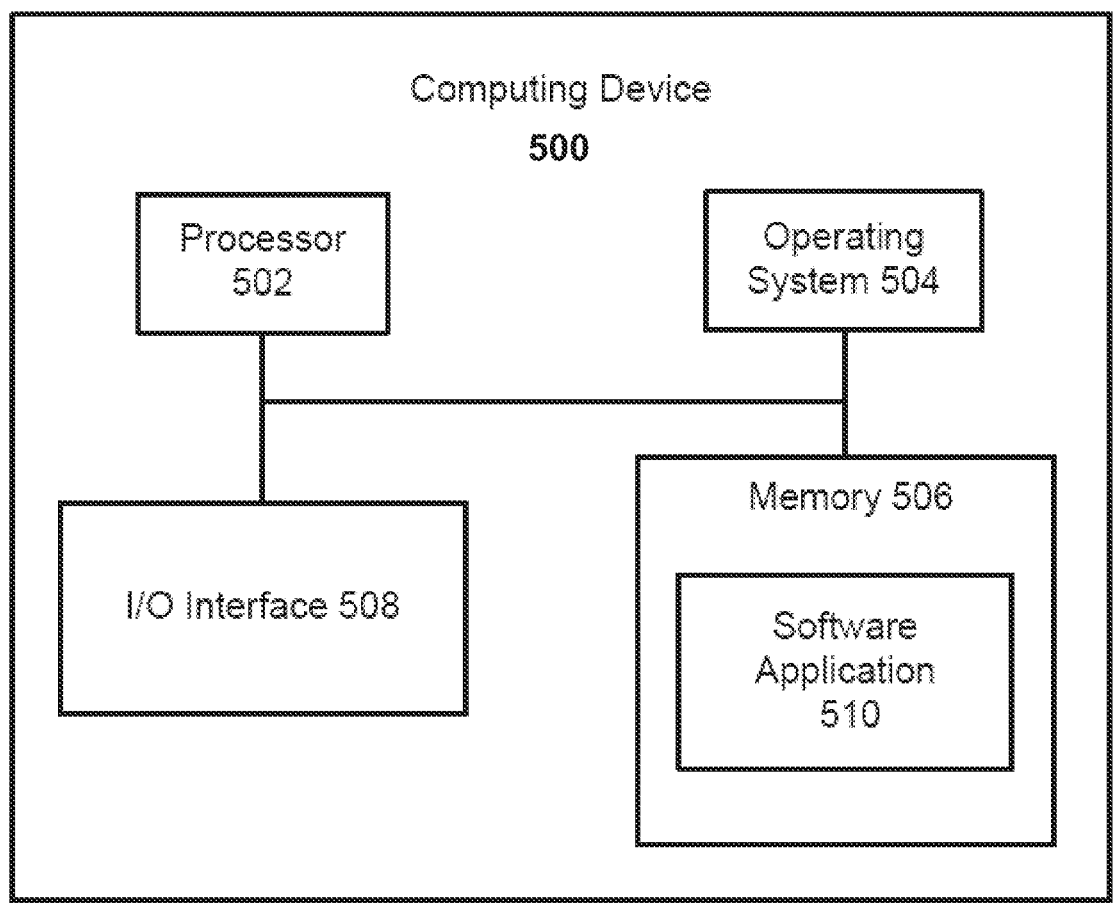
FIG. 6 is a general block diagram of a computing device usable to implement the embodiments of FIGS. 1-5.

FIG. 6 illustrates a block diagram of an example computing system 500, which may be used for implementations described herein. For example, computing system 500 may be used to implement server devices 910, 920 of FIG. 5 as well as to perform the method implementations described herein. In some implementations, computing system 500 may include a processor 502, an operating system 504, a memory 506, and an input/output (I/O) interface 508.

In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 6 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method to estimate round-trip time (RTT) values between two or more meshed data centers serving an internet domain and local domain name servers (LDNSs) that are associated with each of the data centers, each data center including a reflector and a collector, and all jointly including a shared database for storing the estimated round-trip times, wherein each data center is configured to communicate with its associated LDNS, the method including the following steps:
   initializing the shared database with proactively estimated RTT values between one or more of the data centers and their associated LDNS;
   using distributed DNS reflection to increase an estimated RTT value's accuracy; and
   storing the more accurate estimated RTT value in the shared database.

2. The method of claim 1, wherein a proactively estimated RTT value is estimated by using an Internet Control Message Protocol (ICMP) echo request and reply.

3. The method of claim 1, wherein a proactively estimated RTT value is estimated by using Transmission Control Protocol (TCP) SYN and SYN-ACK handshake queries.

4. The method of claim 1, wherein a proactively estimated RTT value is estimated by sending a request from a data center's reflector to the data center's collector via the data center's associated LDNS, and calculating a difference between a receipt time in the data center's collector and a send time in the data center's reflector.

5. The method of claim 1, wherein the shared database includes a distributed ledger.

6. The method of claim 1, wherein a first data center and a second data center share an associated LDNS, and wherein distributed DNS reflection includes the following steps:
- from a first reflector in the first data center with a first estimated RTT to the associated LDNS, sending a request to a second collector in the second data center configured to communicate with the associated LDNS, wherein the request includes a first timestamp that indicates a time of sending the request from the first reflector, and wherein the first estimated RTT is stored in the shared database;
- in the second collector, determining a time of receiving the request;
- calculating a latency by subtracting the time of sending the request from the time of receiving the request;
- retrieving the first estimated RTT from the shared database; and
- calculating a second estimated RTT by doubling a difference between the latency and half the first estimated RTT.

7. The method of claim 1, further comprising using a passive technique for estimating an RTT value.

8. A tangible non-transitory processor-readable medium including instructions executable by one or more processors, and when executed operable to estimate round-trip time (RTT) values between two or more meshed data centers serving an internet domain, each data center including a reflector and a collector, and all jointly including a shared database for storing the estimated round-trip times, wherein each data center is operable to communicate with a local domain name server (LDNS) that is associated with the data center, the estimating including the following steps:
- initializing the shared database with proactively estimated RTT values between one or more of the data centers and their associated LDNS;
- using distributed DNS reflection to increase an estimated RTT value's accuracy; and
- storing the more accurate estimated RTT value in the shared database.

9. The tangible non-transitory processor-readable medium of claim 8, further including using a passively estimated RTT value between a data center and its associated LDNS.

10. The tangible non-transitory processor-readable medium of claim 8, wherein a proactively estimated RTT value is estimated by using an Internet Control Message Protocol (ICMP) echo request and reply.

11. The tangible non-transitory processor-readable medium of claim 8, wherein a proactively estimated RTT value is estimated by using Transmission Control Protocol (TCP) SYN and SYN-ACK handshake queries.

12. The tangible non-transitory processor-readable medium of claim 8, wherein a proactively estimated RTT value is estimated by sending a request from a data center's reflector to the data center's collector via the data center's associated LDNS, and calculating a difference between a receipt time in the data center's collector and a send time in the data center's reflector.

13. The tangible non-transitory processor-readable medium of claim 8, wherein the shared database includes a distributed ledger.

14. The tangible non-transitory processor-readable medium of claim 8, wherein a first data center and a second data center share an associated LDNS, and wherein distributed DNS reflection includes the following steps:
- from a first reflector in the first data center with a first estimated RTT to the associated LDNS, sending a request to a second collector in the second data center operable to communicate with the associated LDNS, wherein the request includes a first timestamp that indicates a time of sending the request from the first reflector, and wherein the first estimated RTT is stored in the shared database;
- in the second collector, determining a time of receiving the request;
- calculating a latency by subtracting the time of sending the request from the time of receiving the request;
- retrieving the first estimated RTT from the shared database; and
- calculating a second estimated RTT by doubling a difference between the latency and half the first estimated RTT.

15. A system including two or more meshed data centers serving an internet domain, each data center including a reflector and a collector, and all data centers jointly including a shared database, wherein each data center is operable to communicate with a local domain name server (LDNS) that is associated with the data center, the system including one or more processors operable to perform operations to estimate round-trip time (RTT) values, the operations including the following steps:
- initializing the shared database with proactively estimated RTT values between one or more of the data centers and their associated LDNS;
- using distributed DNS reflection to increase an estimated RTT value's accuracy; and
- storing the more accurate estimated RTT value in the shared database.

16. The system of claim 15, wherein a proactively estimated RTT value is estimated by using an Internet Control Message Protocol (ICMP) echo request and reply.

17. The system of claim 15, wherein a proactively estimated RTT value is estimated by using Transmission Control Protocol (TCP) SYN and SYN-ACK handshake queries.

18. The system of claim 15, wherein a proactively estimated RTT value is estimated by sending a request from a data center's reflector to the data center's collector via the data center's associated LDNS, and calculating a difference between a receipt time in the data center's collector and a send time in the data center's reflector.

19. The system of claim 15, wherein the shared database includes a distributed ledger.

20. The system of claim 15, wherein a first data center and a second data center share an associated LDNS, and wherein distributed DNS reflection includes the following steps:
- from a first reflector in the first data center with a first estimated RTT to the associated LDNS, sending a request to a second collector in the second data center operable to communicate with the associated LDNS, wherein the request includes a first timestamp that indicates a time of sending the request from the first reflector, and wherein the first estimated RTT is stored in the shared database;
- in the second collector, determining a time of receiving the request;
- calculating a latency by subtracting the time of sending the request from the time of receiving the request;
- retrieving the first estimated RTT from the shared database; and
- calculating a second estimated RTT by doubling a difference between the latency and half the first estimated RTT.

* * * * *